(12) United States Patent
Ahn et al.

(10) Patent No.: US 11,265,543 B2
(45) Date of Patent: Mar. 1, 2022

(54) METHOD, DEVICE, AND RECORDING MEDIUM STORING BIT STREAM, FOR ENCODING/DECODING IMAGE

(71) Applicant: DIGITALINSIGHTS INC., Seoul (KR)

(72) Inventors: Yong Jo Ahn, Seoul (KR); Ho Chan Ryu, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 17/353,607

(22) Filed: Jun. 21, 2021

(65) Prior Publication Data

US 2021/0314569 A1    Oct. 7, 2021

Related U.S. Application Data

(63) Continuation of application No. 16/754,602, filed as application No. PCT/KR2018/012175 on Oct. 16, 2018, now Pat. No. 11,159,793.

(30) Foreign Application Priority Data

Oct. 16, 2017 (KR) .................. 10-2017-0134202

(51) Int. Cl.
 *H04N 19/119* (2014.01)
 *H04N 19/139* (2014.01)
 (Continued)

(52) U.S. Cl.
 CPC ......... *H04N 19/119* (2014.11); *H04N 19/139* (2014.11); *H04N 19/176* (2014.11); *H04N 19/96* (2014.11)

(58) Field of Classification Search
 CPC .. H04N 19/119; H04N 19/139; H04N 19/176; H04N 19/96; H04N 19/147; H04N 19/70
 See application file for complete search history.

(56) References Cited

U.S. PATENT DOCUMENTS

| 9,020,030 B2 * | 4/2015 | Chen ..................... H04N 19/66 375/240.01 |
| 9,326,003 B2 | 4/2016 | Guo et al. |

(Continued)

FOREIGN PATENT DOCUMENTS

| CA | 2794351 A1 * | 10/2011 | ............. H04N 19/14 |
| CN | 1130845 A * | 9/1996 | ........... H04N 19/543 |

(Continued)

OTHER PUBLICATIONS

Ahn, Non-Final Office Action, U.S. Appl. No. 16/754,602, dated Apr. 14, 2021, 9 pgs.

(Continued)

*Primary Examiner* — Robert J Hance
(74) *Attorney, Agent, or Firm* — Morgan, Lewis & Bockius LLP

(57) ABSTRACT

The invention relates to a method for encoding/decoding an image. The image decoding method according to the invention comprises the steps of: obtaining diagonal partition information on a current block; determining a diagonal partition structure of the current block using the diagonal partition information; and diagonally partitioning the current block into a first and a second area based on the determined diagonal partition structure, the current block being a leaf node of a square or rectangular partition.

7 Claims, 9 Drawing Sheets

(51) Int. Cl.
*H04N 19/176* (2014.01)
*H04N 19/96* (2014.01)

(56) References Cited

U.S. PATENT DOCUMENTS

| | | |
|---|---|---|
| 2009/0034854 A1 | 2/2009 | Lee et al. |
| 2009/0196342 A1 | 8/2009 | Divorra Escoda et al. |
| 2011/0200109 A1* | 8/2011 | Joshi ............... H04N 19/513 375/240.16 |
| 2011/0200111 A1* | 8/2011 | Chen ............... H04N 19/615 375/240.16 |
| 2011/0249735 A1* | 10/2011 | Zhao ............... H04N 19/46 375/240.12 |
| 2012/0106627 A1 | 5/2012 | Guo et al. |
| 2012/0177106 A1 | 7/2012 | Divorra Escoda et al. |
| 2012/0236943 A1 | 9/2012 | Lee et al. |
| 2013/0089265 A1* | 4/2013 | Yie ............... H04N 19/503 382/238 |
| 2015/0010085 A1 | 1/2015 | Yie et al. |
| 2016/0295215 A1* | 10/2016 | Hsu ............... H04N 19/105 |
| 2017/0280156 A1* | 9/2017 | Divorra Escoda ..... H04N 19/70 |
| 2018/0103273 A1* | 4/2018 | Guo ............... H04N 19/17 |
| 2019/0149828 A1* | 5/2019 | Jeong ............... H04N 19/44 375/240.12 |
| 2020/0014950 A1* | 1/2020 | Abe ............... H04N 19/157 |
| 2020/0359020 A1 | 11/2020 | Ahn et al. |

FOREIGN PATENT DOCUMENTS

| | | | |
|---|---|---|---|
| CN | 101325710 A * | 12/2008 | ............. H04N 19/53 |
| CN | 101325710 A | 12/2008 | |
| KR | 20110134319 A | 12/2011 | |
| KR | 101408698 B1 | 6/2014 | |
| KR | 101515696 B1 | 4/2015 | |
| KR | 101740039 B1 | 5/2017 | |
| WO | WO 2018/072823 A1 | 4/2018 | |
| WO | WO-2018072823 A1 * | 4/2018 | ........... H04N 19/139 |
| WO | WO 2019/039322 A1 | 2/2019 | |
| WO | WO 2019/078581 A1 | 4/2019 | |

OTHER PUBLICATIONS

DigitalInsights, Inc., International Preliminary Report on Patentability, PCT/KR2018/012175, dated Apr. 21, 2020, 8 pgs.

DigitalInsights, Inc., International Search Report and Written Opinion, PCT/KR2018/012175, dated Jan. 23, 2019, 13 pgs.

Ahn, Notice of Allowance, U.S. Appl. No. 16/754,602, dated Sep. 8, 2021, 8 pgs.

* cited by examiner

METHOD, DEVICE, AND RECORDING MEDIUM STORING BIT STREAM, FOR ENCODING/DECODING IMAGE

CROSS REFERENCE TO RELATED APPLICATIONS

This application is a continuation application of U.S. patent application Ser. No. 16/754,602, filed Apr. 8, 2020, which is a United States National Stage Application filed under 35 U.S.C. § 371 of PCT Patent Application Ser. No. PCT/KR2018/012175 filed on Oct. 16, 2018, which claims the benefit of and priority to Korean Patent Application No. 10-2017-0134202 filed on Oct. 16, 2017. U.S. patent application Ser. No. 16/754,602, filed Apr. 8, 2020, is hereby incorporated by reference in its entirety.

TECHNICAL FIELD

The present invention relates to an image encoding/decoding method and apparatus. Specifically, the present invention relates to an image encoding/decoding method, apparatus using diagonal division on a block structure using a combination of various block division types in inter prediction, and recording medium storing bitstream generated by the image encoding method/apparatus of the present invention.

BACKGROUND ART

The market demands for high resolution video is increasing, and accordingly, a technology capable of efficiently compressing high resolution video is required. According to these market demands, ISO/IEC's Moving Picture Expert Group (MPEG) and ITU-T's Video Coding Expert Group (VCEG) jointly formed JCT-VC (Joint Collaborative Team on Video Coding), completed the development of the HEVC (High Efficiency Video Coding) video compression standard in January 2013, and has been actively researching and developing next-generation compression standards.

Video compression is largely composed of on-screen prediction (or intra prediction), inter-screen prediction (or inter prediction), transformation, quantization, entropy encoding, and in-loop filter. Meanwhile, as the demand for high-resolution video increases, the demand for stereoscopic video content as a new video service also increases. Discussion of video compression technology for effectively providing high-resolution and ultra-high-resolution stereoscopic image content is ongoing.

DISCLOSURE

Technical Problem

An object of the present invention is to provide an image encoding/decoding method with improved compression efficiency, and a recording medium storing a bitstream generated by the image encoding method/apparatus of the present invention.

In addition, an object of the present invention is to provide an image encoding/decoding method using inter prediction with improved compression efficiency, and a recording medium storing a bitstream generated by the image encoding method/apparatus of the present invention.

In addition, an object of the present invention is to provide an image encoding/decoding method for efficiently performing prediction using diagonal division on a block structure using a combination of various block division types, and a recording medium storing a bitstream generated by the image encoding method/apparatus of the present invention.

Technical Solution

An image decoding method according to the present invention may comprise obtaining diagonal division information for a current block, determining a diagonal division structure of the current block using the diagonal division information, and performing diagonal division to divide the current block into a first region and a second region diagonally according to the determined diagonal division structure, wherein the current block may be a leaf node of square division or non-square division.

In the image decoding method according to the present invention, wherein the diagonal division information may include a flag indicating whether the current block is diagonally divided.

In the image decoding method according to the present invention, wherein the diagonal division may be determined as one of a down-right diagonal division and an up-right diagonal division according to a direction of the diagonal division.

In the image decoding method according to the present invention, wherein the diagonal division information may include division direction information indicating the direction of the diagonal division, and wherein the performing diagonal division may be dividing the current block diagonally in the direction indicated by the division direction information.

In the image decoding method according to the present invention, wherein the performing diagonal division may comprise performing masking on the current block, and wherein the masking may be that a predetermined weight operation is performed on a sample of the current block.

In the image decoding method according to the present invention, wherein the current block may consist of a first sample consisting of samples in one direction based on a boundary line of the diagonal division among samples included in an area in which the boundary line does not pass, a second sample consisting of samples through which the boundary line of the diagonal division passes, and a third sample consisting of samples that do not belong to the first sample and the second sample among samples of the current block, wherein the masking for the first region may be that a first value is applied to the first sample, a second value is applied to the second sample, and a third value is applied to the third sample respectively, and wherein the masking for the second region may be that the third value is applied to the first sample, the second value to the second sample, and the third value to the third sample respectively.

In the image decoding method according to the present invention, when the boundary line of the diagonal division is expressed by f (x, y), wherein the masking for the first region and the masking for the second region may satisfy Equation 1 below, $$MASK_{P0}(x, y) = \begin{cases} 2, & \text{if } f(x, y) > 0, \\ 1, & \text{if } f(x, y) = 0, \\ 0, & \text{otherwise,} \end{cases} \quad [\text{Equation 1}]$$

and $$MASK_{P1}(x, y) = \begin{cases} 0, & \text{if } f(x, y) > 0, \\ 1, & \text{if } f(x, y) = 0, \\ 2, & \text{otherwise.} \end{cases}$$

wherein, Mask_p0 (x, y) may represent a masking value for the first region, and MASK_p1 (x, y) may represent a masking value for the second region.

In the image decoding method according to the present invention, wherein a sample value of the current block may satisfy Equation 2 below, $$P_{DMP}(x,y) = (P_{P0}(x,y) \times \text{MASK}_{P0}(x,y) + P_{P1}(x,y) \times \text{MASK}_{P1}(x,y)) \gg \text{shift} \quad \text{[Equation 2]}$$

wherein, P_DMP (x, y) may represent a specific sample value of the current block, P_p0 (x, y) may represent sample values of samples belonging to the first region, P_p1 (x, y) may represent sample values of samples belonging to the second region, and the shift may represent a scaling value according to the masking.

In the image decoding method according to the present invention, wherein the square division or the non-square division may be one of quad-tree division, binary-tree division and ternary-tree division.

An image encoding method according to the present invention may comprise determining a diagonal division structure of a current block, performing diagonal division to divide the current block into a first region and a second region diagonally according to the determined diagonal division structure, and encoding diagonal division information for the diagonal division structure, wherein the current block may be a leaf node of square division or non-square division.

The image encoding method according to the present invention further may comprise encoding a flag indicating whether the current block is diagonally divided.

In the image encoding method according to the present invention, wherein the diagonal division may be determined as one of a down-right diagonal division and an up-right diagonal division according to a direction of diagonal division.

The image encoding method according to the present invention further may comprise encoding division direction information indicating a direction of the diagonal division.

In the image encoding method according to the present invention, wherein the performing diagonal division may comprise performing masking on the current block, and wherein the masking may be that a predetermined weight operation is performed on a sample of the current block.

In the image encoding method according to the present invention, wherein the current block may consist of a first sample consisting of samples in one direction based on a boundary line of the diagonal division among samples included in an area in which the boundary line does not pass, a second sample consisting of samples through which the boundary line of the diagonal division passes, and a third sample consisting of samples that do not belong to the first sample and the second sample among samples of the current block, wherein the masking for the first region may be that a first value is applied to the first sample, a second value is applied to the second sample, and a third value is applied to the third sample respectively, and wherein the masking for the second region is that the third value is applied to the first sample, the second value to the second sample, and the third value to the third sample respectively.

In the image encoding method according to the present invention, when the boundary line of the diagonal division is expressed by f (x, y), wherein the masking for the first region and the masking for the second region may satisfy Equation 3 below, $$\text{MASK}_{P0}(x, y) = \begin{cases} 2, & \text{if } f(x, y) > 0, \\ 1, & \text{if } f(x, y) = 0, \\ 0, & \text{otherwise}, \end{cases} \quad \text{[Equation 3]}$$

and $$\text{MASK}_{P1}(x, y) = \begin{cases} 0, & \text{if } f(x, y) > 0, \\ 1, & \text{if } f(x, y) = 0, \\ 2, & \text{otherwise}. \end{cases}$$

wherein, Mask_p0 (x, y) may represent a masking value for the first region, and MASK_p1 (x, y) may represent a masking value for the second region.

In the image encoding method according to the present invention, wherein a sample value of the current block may satisfy Equation 4 below, $$P_{DMP}(x,y) = (P_{P0}(x,y) \times \text{MASK}_{P0}(x,y) + P_{P1}(x,y) \times \text{MASK}_{P1}(x,y)) \gg \text{shift} \quad \text{[Equation 4]}$$

wherein, P_DMP (x, y) may represent a specific sample value of the current block, P_p0 (x, y) may represent sample values of samples belonging to the first region, P_p1 (x, y) may represent sample values of samples belonging to the second region, and the shift may represent a scaling value according to the masking.

In the image encoding method according to the present invention, wherein the square division or the non-square division may be one of quad-tree division, binary-tree division and ternary-tree division.

A non-transitory storage medium may store a bitstream generated by an image encoding method, wherein the image encoding method may comprise determining a diagonal division structure of a current block, performing diagonal division to divide the current block into a first region and a second region diagonally according to the determined diagonal division structure, and encoding diagonal division information for the diagonal division structure, and wherein the current block may be a leaf node of square division or non-square division.

Advantageous Effects

According to the present invention, an image encoding/decoding method with improved compression efficiency, an apparatus, and a recording medium storing a bitstream generated by the image encoding method/apparatus of the present invention may be provided.

In addition, according to the present invention, an image encoding/decoding method using inter prediction with improved compression efficiency, and a recording medium storing a bitstream generated by the image encoding method/apparatus of the present invention may be provided.

In addition, according to the present invention, an image encoding/decoding method, apparatus for efficiently performing inter prediction using diagonal division on a block structure using a combination of various block division types, and a recording medium storing a bitstream generated by the image encoding method/apparatus of the present invention may be provided.

MODE FOR INVENTION

Figure 1:
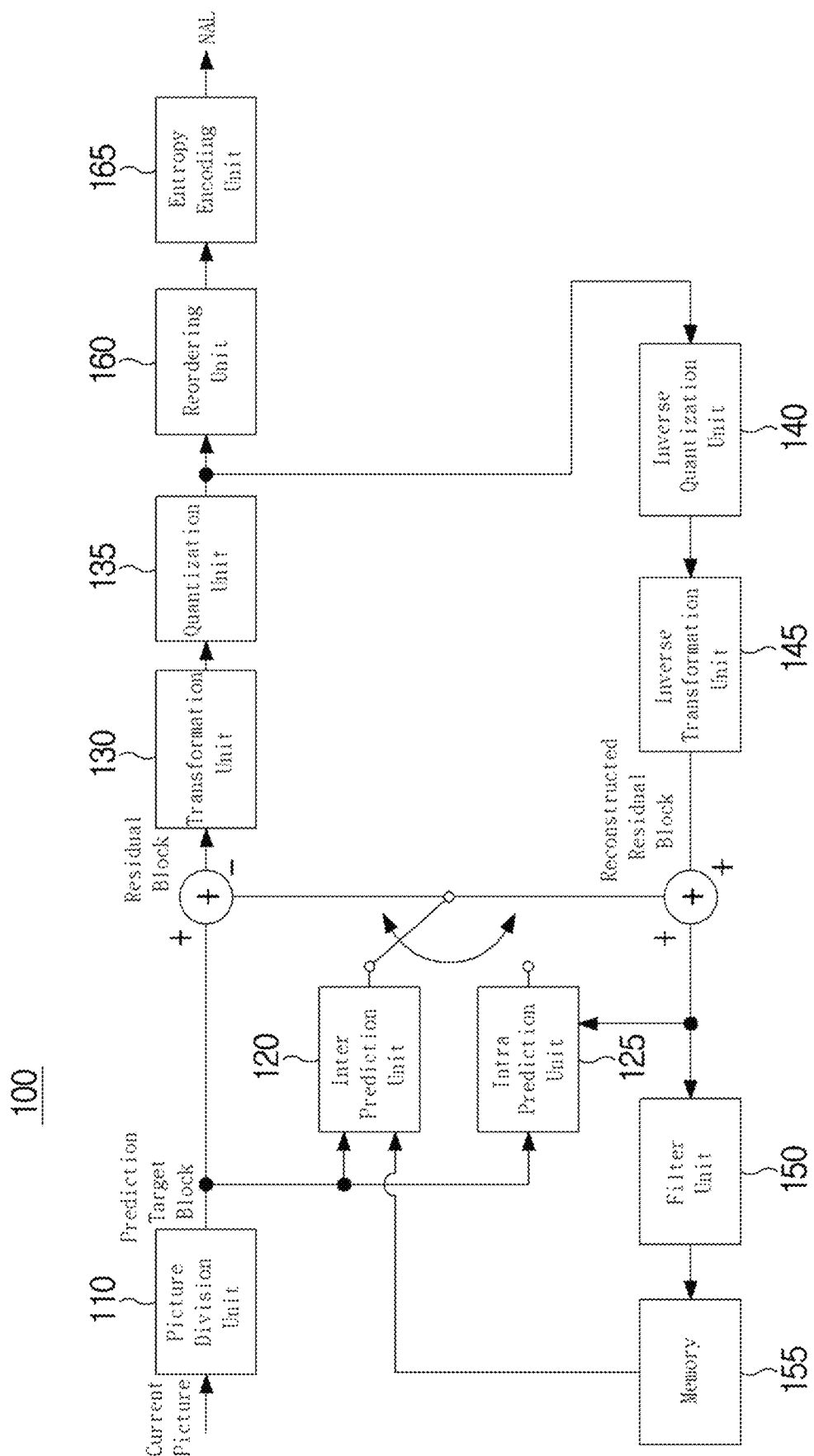
FIG. 1 is a block diagram showing a configuration according to an embodiment of an encoding apparatus to which the present invention is applied.

Hereinafter, embodiments of the present invention will be described in detail with reference to the drawings attached thereto, so that those skilled in the art may easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, the terms first, second, etc. may be used to describe various components, but the components should not be limited by the terms. The terms are used only for the purpose of distinguishing one component from another.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present invention may be added to the second embodiment of the present invention, or may replace some of the components or steps of the second embodiment.

In addition, the components shown in the embodiments of the present invention are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present invention without departing from the essence of the present invention.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, an apparatus included in a server terminal such as a TV application server and a service server, and may mean a user terminal such as various apparatuses, a communication apparatus such as a communication modem for performing communication with a wired/wireless communication network, a memory for storing various programs and data for decoding an image or performing an inter prediction or intra prediction for decoding, various apparatuses equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present invention will be described in detail with reference to the accompanying drawings. In describing the present invention, redundant description of the same components will be omitted.

FIG. 1 is a block diagram showing an image encoding apparatus according to the present invention. Referring to FIG. 1, a conventional image encoding apparatus 100 may include a picture division unit 110, a prediction unit 120, 125, a transformation unit 130, a quantization unit 135, a reordering unit 160, an entropy encoding unit 165, an inverse quantization unit 140, an inverse transformation unit 145, a filter unit 150, and a memory 155.

The picture division unit 110 may divide an input picture into at least one processing unit. In this case, the processing unit may be a prediction unit (PU), a transformation unit (TU), or a coding unit (CU). Hereinafter, in an embodiment of the present invention, a coding unit may be used as a meaning of a unit that performs encoding or may be used as a meaning of a unit that performs decoding.

The prediction unit may be divided into at least one square or non-square shape having the same size within one coding unit, or may be divided such that any one prediction unit divided within one coding unit has a different shape and/or size from another prediction unit. When generating a prediction unit that performs intra prediction based on a coding unit, if the prediction unit is not a minimum coding unit, intra prediction may be performed without dividing into a plurality of prediction units N×N.

The prediction units 120 and 125 may include an inter prediction unit 120 that performs inter prediction or inter-screen prediction, and an intra prediction unit 125 that performs intra prediction or intra-screen prediction. It may be determined whether to use inter prediction or intra prediction for a prediction unit, and specific information (e.g., intra prediction mode, motion vector, reference picture, etc.) according to each prediction method may be determined. A residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. However, when the motion information derivation technique of the decoder side according to the present invention is applied, since the prediction mode information, motion vector information, and the like are not generated in the encoder, the corresponding information is not transmitted to the decoder. On the other hand, it is possible to signal and transmit information indicating that the motion information is derived from the decoder side and used, and information on a technique used to derive the motion information from the encoder.

The inter prediction unit 120 may predict a prediction unit based on information of at least one of a previous picture or a subsequent picture of the current picture, and in some cases, may predict the prediction unit based on information of some regions that have been coded in the current picture. The inter prediction unit 120 may include a reference picture interpolation unit, a motion prediction unit, and a motion compensation unit.

The reference picture interpolator may receive reference picture information from the memory 155 and generate pixel information of an integer pixel or less in the reference picture. In the case of a luminance pixel, a DCT-based 8-tap interpolation filter (DCT-based interpolation filter) having different filter coefficients may be used to generate pixel information of integer pixels or less in a unit of a ¼ pixel. In the case of a chrominance signal, a DCT-based interpolation filter having different filter coefficients may be used to generate pixel information of integer pixels or less in a unit of a ⅛ pixel.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in a unit of a ½ or ¼ pixel based on interpolated pixels. The motion prediction unit may predict a current prediction unit by differently using a motion prediction method. As the motion prediction method, various methods such as a skip method, a merge method, an advanced motion vector prediction (AMVP) method, and an intra block copy method may be used. In addition, when applying the motion information derivation technique of the decoder side according to the present invention, as a method performed by the motion prediction unit, a template matching method and a bilateral matching method using a motion trajectory may be applied. In relation, the template matching method and the bilateral matching method will be described later in detail in FIG. 3.

The intra prediction unit 125 may generate a prediction unit based on reference pixel information around a current block, which is pixel information in a current picture. When a neighboring block of a current prediction unit is a block that has performed inter prediction, and a reference pixel is a pixel that has performed inter prediction, the reference pixel included in a block that has performed inter prediction may be replaced with reference pixel information of a neighboring block that has performed inter prediction. That is, when the reference pixel is unavailable, the information of the unavailable reference pixel may be replaced with at least one reference pixel among the available reference pixels.

In addition, a residual block including residual information that is a difference value between a prediction unit that performs prediction based on prediction units generated by the prediction units 120, 125 and an original block of the prediction unit may be generated. The generated residual block may be input to the transformation unit 130.

The transformation unit 130 transform s a residual block including the residual information of the prediction unit generated by the original block and the prediction units 120 and 125 using transformation method such as DCT (Discrete Cosine Transform), DST (Discrete Sine Transform), and KLT. Whether to apply DCT, DST, or KLT to transform the residual block may be determined based on information of an intra prediction mode of the prediction unit used to generate the residual block.

The quantization unit 135 may quantize values converted from the transformation unit 130 to a frequency domain. Quantization coefficients may vary depending on a block or importance of an image. A value calculated by the quantization unit 135 may be provided to the inverse quantization unit 140 and the reordering unit 160.

The reordering unit 160 may reorder the coefficient values with respect to the quantized residual value.

The reordering unit 160 may change a block shape coefficient of 2D into a vector form of 1D through a coefficient scanning method. For example, the reordering unit 160 may scan a DC coefficient to a coefficient in a high-frequency region using a Zig-Zag Scan method and change it into a one-dimensional vector form. Depending on a size of a transform unit and an intra prediction mode, a vertical scan in which two-dimensional block shape coefficients are scanned in the column direction and a horizontal scan in which two-dimensional block shape coefficients are scanned in the row direction may be used instead of the zig-zag scan. That is, depending on the size of the transform unit and the intra prediction mode, it is possible to determine which scan method is used among the zigzag scan, the vertical scan, and the horizontal scan.

The entropy encoding unit 165 may perform entropy encoding based on values calculated by the reordering unit 160. The entropy encoding may use various encoding methods, such as exponential Golomb, CAVLC (Context-Adaptive Variable Length Coding), and CABAC (Context-Adaptive Binary Arithmetic Coding). In relation to this, the entropy encoding unit 165 may encode residual value coefficient information of a coding unit from the reordering unit 160 and the prediction units 120 and 125. In addition, according to the present invention, it is possible to signal and transmit information indicating that the motion information is derived and used in the decoder side and information on a technique used to derive the motion information.

The inverse quantization unit 140 and the inverse transformation unit 145 inverse quantize values quantized by the quantization unit 135 and inversely transform values transformed by the transformation unit 130. A reconstructed block may be generated by adding the residual values generated by the inverse quantization unit 140 and the inverse transformation unit 145 to a prediction unit predicted through a motion estimation unit, a motion compensation unit and an intra prediction unit included in the prediction units 120 and 125

The filter unit 150 may include at least one of a deblocking filter, an offset correction unit, and an adaptive loop filter (ALF). The deblocking filter may remove block distortion caused by boundary between blocks in a reconstructed picture. The offset correction unit may correct an offset from an original image in a unit of a pixel for a deblocking image. In order to perform offset correction for a specific picture, after dividing pixels included in an image into a certain number of regions, a method of determining an area to perform an offset and applying the offset to the corresponding area or a method of applying an offset in consideration of edge information of each pixel may be used. ALF (Adaptive Loop Filtering) may be performed based on a value obtained by comparing a filtered reconstructed image with an original image. After dividing a pixel included in the image into a predetermined group, one filter to be applied to the corresponding group may be determined to perform differential filtering for each group.

The memory 155 may store reconstructed blocks or pictures calculated through the filter unit 150, and the stored reconstructed blocks or pictures may be provided to the predictors 120 and 125 when performing inter prediction.

Figure 2:
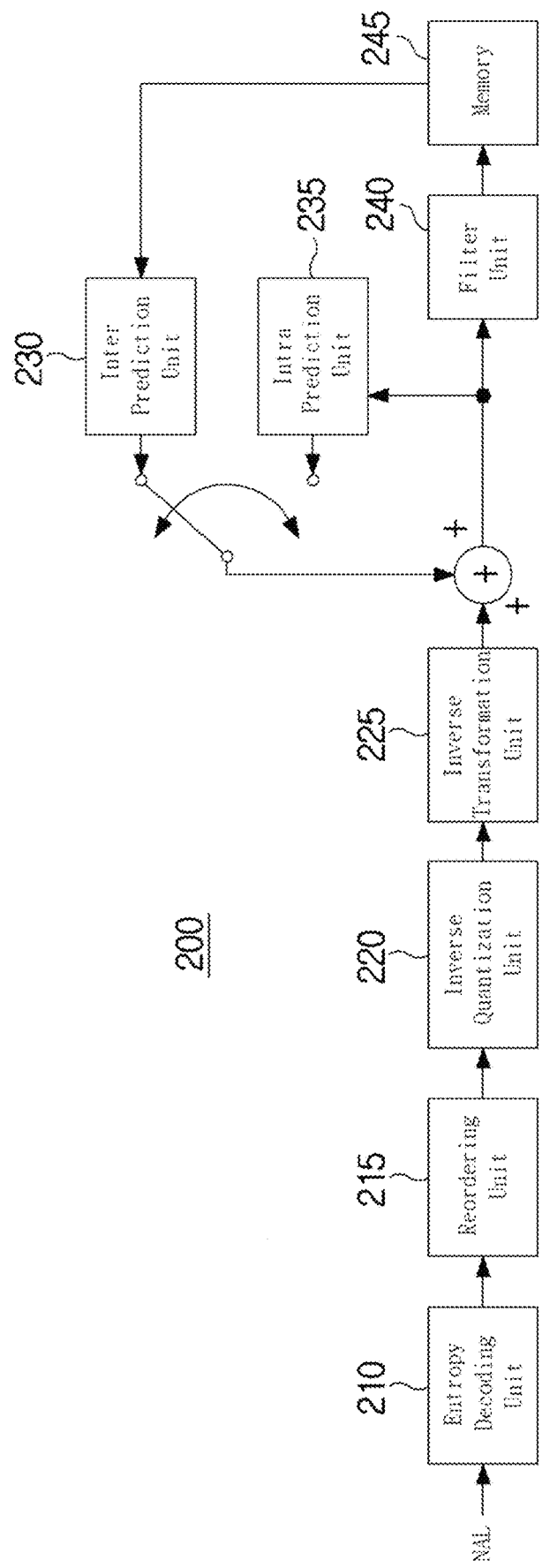
FIG. 2 is a block diagram showing a configuration according to an embodiment of a decoding apparatus to which the present invention is applied.

FIG. 2 is a block diagram showing an image decoding apparatus according to the present invention. Referring to FIG. 2, an image decoder 200 may include an entropy decoding unit 210, a reordering unit 215, an inverse quantization unit 220, an inverse transform unit 225, a prediction unit 230, 235, a filter unit 240, and a memory 245.

When an image bitstream is input from an image encoder, the input bitstream may be decoded in a procedure opposite to that of the image encoder.

The entropy decoding unit 210 may perform entropy decoding in a procedure opposite to that performed by entropy encoding in the entropy encoding unit of the image encoder. For example, various methods such as Exponential Golomb, Context-Adaptive Variable Length Coding (CAVLC), and Context-Adaptive Binary Arithmetic Coding (CABAC) may be applied corresponding to the method performed in the image encoder.

The entropy decoding unit 210 may decode information related to intra prediction and inter prediction performed by the encoder.

The reordering unit 215 may perform reordering based on a method of reordering the bitstream entropy-decoded by the entropy decoding unit 210 in the encoding unit. The coefficients expressed in the form of a one-dimensional vector may be reconstructed into coefficients in a two-dimensional block form and rearranged.

The inverse quantization unit 220 may perform inverse quantization based on the quantization parameter provided by the encoder and the coefficient values of the rearranged blocks.

The inverse transform unit 225 may perform inverse transform, that is, inverse DCT, inverse DST, and inverse KLT, for the transformation performed by the transform unit KLT, for the quantization results performed by the image encoder, that is, DCT, DST, and KLT. The inverse transform may be performed based on a transmission unit determined by the image encoder. In the inverse transform unit 225 of the image decoder, a transform method (for example, DCT, DST, KLT) may be selectively performed according to a plurality of information such as a prediction method, a size of a current bloc, and a prediction direction.

The prediction units 230 and 235 may generate a prediction block based on prediction block generation related information provided by the entropy decoding unit 210 and previously reconstructed block or picture information provided by the memory 245.

As described above, when performing intra prediction or intra prediction in the same manner as the operation in the image encoder, if a size of a prediction unit and a size of a transformation unit are the same, intra prediction may be performed on the prediction unit based on a pixel on the left side of the prediction unit, a pixel on the top left side, and a pixel on the top side, but if the size of the prediction unit and the size of the transformation unit are different, intra prediction may be performed using a reference pixel based on the transformation unit. In addition, intra prediction using N×N splitting may be used only for the smallest coding unit.

The prediction units 230 and 235 may include a prediction unit determination unit, an inter prediction unit, and an intra prediction unit. The prediction unit determination unit may receive various information such as prediction unit information, prediction mode information of an intra prediction method, and motion prediction related information of an inter prediction method input from the entropy decoding unit 210, classify the prediction unit from the current coding unit, and determine whether the prediction unit performs inter prediction or intra prediction. On the other hand, if the encoder 100 does not transmit the motion prediction related information for the inter prediction, but instead, it transmits information indicating that the motion information is derived and used in the decoder side, and information on a technique used to derive the motion information, the prediction unit determination unit determines the prediction performance of the inter prediction unit 23 based on the information transmitted from the encoder 100.

The inter predictor 230 may perform inter prediction for the current prediction unit based on information included in at least one of a previous picture or a subsequent picture of the current picture including the current prediction unit, using information required for inter prediction of the current prediction unit provided by the image encoder. In order to perform inter prediction, it may be determined whether a motion prediction method of a prediction unit included in a corresponding coding unit based on a coding unit is a skip mode, a merge mode, an AMVP mode, or an intra block copy mode. Alternatively, the inter prediction unit 230 may perform inter prediction by deriving motion information by itself, from the information indicating that the decoder derives and uses motion information from the decoder side and information on a technique used to derive motion information, provided by the image encoder.

The intra prediction unit 235 may generate a prediction block based on pixel information in a current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on a reference pixel of the current block and may be applied by determining whether to apply the filter according to a prediction mode of the current prediction unit. AIS filtering may be performed on a reference pixel of a current block by using prediction mode and AIS filter information of a prediction unit provided by an image encoder. When a prediction mode of a current block is a mode that does not perform AIS filtering, the AIS filter may not be applied.

When the prediction mode of the prediction unit is a prediction unit that performs intra prediction based on a pixel value interpolated with a reference pixel, the reference pixel interpolation unit may interpolate the reference pixel to generate a reference pixel in a pixel unit of an integer value or less. If the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset correction unit, and an ALF.

Information about whether a deblocking filter is applied to a corresponding block or picture and information about whether a strong filter is applied or a weak filter is applied may be provided from the image encoder. In a deblocking filter of the image decoder, information related to the deblocking filter provided by the image encoder may be provided, and the image decoder may perform deblocking filtering on the corresponding block.

The offset correction unit may perform offset correction on a reconstructed image based on the type of offset correction and offset value information applied to an image during encoding. ALF may be applied to a coding unit based on ALF application information, ALF coefficient information, and the like, provided by an encoder. Such ALF information may be provided by being included in a specific parameter set.

The memory 245 may store the reconstructed picture or block so that it may be used as a reference picture or a reference block, and also provide the reconstructed picture to an output unit.

Figure 3:
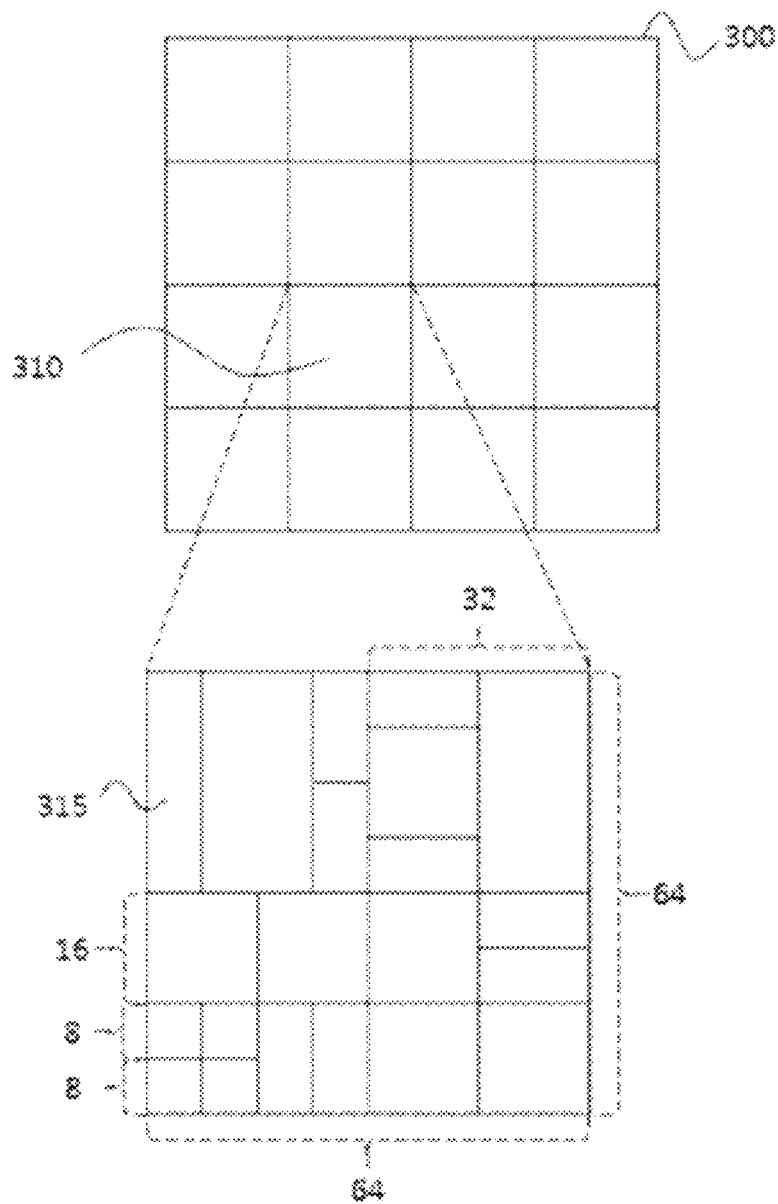
FIG. 3 is a diagram for explaining an image division structure when encoding and decoding an image.

FIG. 3 is a diagram for explaining an image division structure when encoding and decoding an image.

Referring to FIG. 3, a block structure to which various block division forms that may be applied to the present invention are applied will be described. FIG. 3 shows a process in which one image 300 is divided into one or more sub-units 310 and 315.

For efficient encoding and decoding of an image, a coding unit may be used as a basic unit of encoding/decoding. In addition, the coding unit may be a unit in which prediction modes are distinguished when encoding/decoding an image, a transformation and inverse transformation unit, a quantization unit, and a basic unit of encoding/decoding units of transform coefficients.

According to FIG. 3, one image 300 may be sequentially divided into a largest coding unit (LCU) 310 and a lower unit 315. Herein, the structure of division may be determined in a unit of the LCU. The division of a unit in an image may mean division of a block corresponding to a unit. Division information may include information about the depth of a coding unit or block. Here, the depth may mean the number or degree of division of a specific unit.

One unit may be divided into a plurality of sub-units 315 based on the division information. Each divided sub-unit may have the division information for the sub-unit, and may have depth information or size information of the sub-unit.

Here, the division information may refer to a configuration of a coding unit (CU) in a coding tree unit (CTU). The division information may be determined according to whether one CU is divided into a plurality of CUs. The plurality of CUs generated by the division may have a positive integer value of 2 or more in a horizontal size or a vertical size. Here, the horizontal size and the vertical size may be the same or different values.

A plurality of CUs may be recursively divided again. According to the recursive division, a CU to be divided may have a smaller horizontal size or vertical size than at least one of a horizontal size or a vertical size compared to a CU before being divided. Here, the recursive division of the CU may be recursively performed up to a predefined size. An encoding unit having a minimum size in which recursive partitioning is no longer performed may be defined as a smallest coding unit (SCU). The SCU may have a predefined maximum depth value. That is, division is started from the LCU, and the SCU may be generated through recursive division.

Referring to FIG. 3, the LCU 310 having a depth of 0 may be 64×64 blocks. Where 0 may be the minimum depth. On the other hand, the SCU having the maximum depth may have a depth of 3. Where 3 may be the maximum depth. 32×32 and 16×16 may have depths 1 and 2, respectively. Also, 32×16 may have a depth value of 2.

One CU may be divided into 4 units. When one CU is divided into 4 units, the horizontal size and vertical size of a divided CU may each have a size of half of the CU before division. When one CU is divided into four CUs, it may be said that the coding unit is divided in the form of a quad-tree.

In addition, one CU may be divided into 2 units. When one CU is divided into two CUs, at least one of a horizontal size or a vertical size of the divided CU may be half of the CU before division. For example, if a CU of 32×32 size is divided into two CUs, the two divided CUs may each have a size of 32×16. When one CU is divided into two CUs, it may be said that the CU is divided in the form of a binary-tree or a two-partition tree.

In addition, one CU may be divided into 3 units. When one CU is divided into three units, at least one of a horizontal size and a vertical size of the divided CU may be determined as one of sizes determined by dividing the size of one CU by a specific ratio. For example, if a CU of 32×32 size is divided into 3 CUs, it may be divided at a ratio of 1:2:1. In this case, a CU of 32×32 size may have a size of 32×8, 32×16 and 32×8. When one CU is divided into three CUs, it may be said that the CU is divided in the form of a ternary-tree or a three-partition tree.

FIG. 3 shows the result of one LCU 310 divided through a quad tree, a binary tree, and a ternary tree. In this way, an encoder and a decoder may apply one of quad-tree division, binary-tree division, and three-partition tree division to divide a CTU. Here, each division may be applied according to a predefined order. For example, quad-tree division may be preferentially applied to an LCU. In this case, a CU in which quad-tree division may no longer be applied may be a leaf node of quad-tree division. The leaf node of the quad-tree division may be a root node of a binary tree division or a three-partition tree division.

A CU corresponding to each node of a quad-tree may be determined through quad-tree division information. For example, when the quad-tree division information has a first value, quad division information may indicate that a CU is recursively divided into a quad-tree. On the other hand, when the quad-tree division information has a second value, the quad division information of the corresponding CU may indicate that the corresponding CU is no longer divided into a quad-tree.

Priority may not exist between a binary tree division and a three-partition tree division. That is, the leaf node of the quad tree may or may not be divided by at least one of a binary tree division or a three-partition tree division. When there is no priority between a binary tree partition and a three-partition tree division for a specific CU, it may be said that the partition of the CU is divided in the form of a multi-type tree division.

Each of information on whether to divide, information on the type of division, information on division direction, etc. may be signaled by a flag having a predetermined length.

The prediction using diagonal division proposed by the present invention may be applied to a block to which at least one of the above-described quad-tree division, binary-tree division or ternary-tree division is applied. In addition, a block in which the diagonal division is applied according to the present invention and a block in which at least one of the above-described quad-tree division, binary-tree division or ternary-tree division is applied are adjacent, so various types of prediction may be performed.

Hereinafter, an image encoding/decoding method according to the present invention will be described in detail based on the above-mentioned matter.

Figure 4:
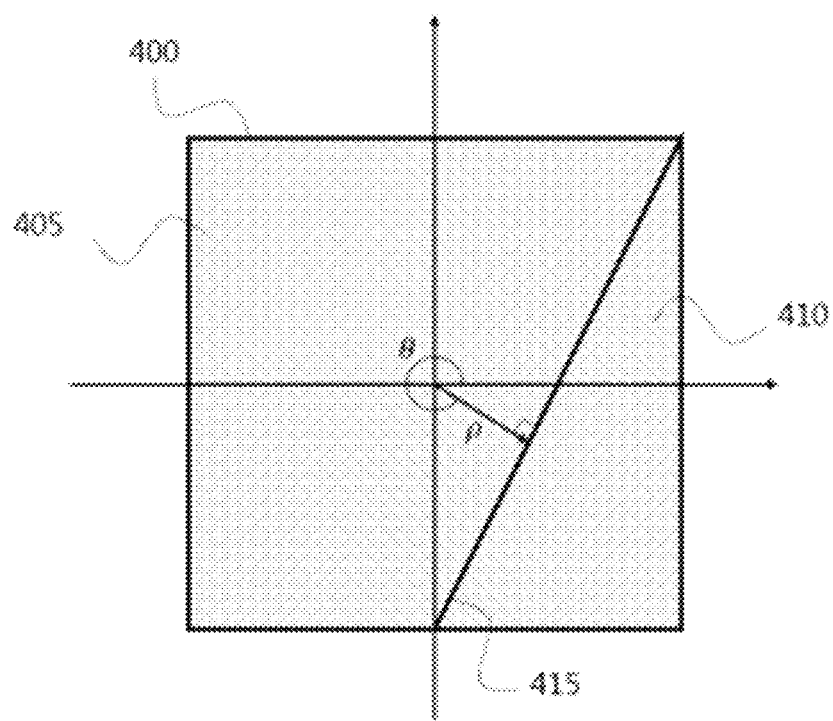
FIG. 4 is a diagram for explaining a Geometry motion partition (GEO).

FIG. 4 is a diagram for explaining a Geometry motion partition (GEO).

For efficient image encoding/decoding, a Geometry motion partition (GEO) that divides a specific block into an arbitrary form and performs prediction in the form of division based on the past standardization meeting of JCT-VC (Joint Collaboration Team Video Coding) has been discussed. The encoding target block may be divided into various types by GEO to perform image encoding/decoding.

The existing GEO-based decoding apparatus may divide one block 400 into two different regions 405 and 410. In this case, a boundary line dividing one block into two areas may be defined as a boundary line 415 of GEO division. The boundary line 415 of the GEO division using a straight line may be determined by two variables, an angle value ( ) and a normal length ( ). Here, the angle value may mean an angle between the reference line and the normal line, and the normal length may mean a distance from the origin to the boundary line 415 of the GEO division.

Division using GEO has the advantage of being able to divide various types of blocks, but has a disadvantage in that both the above-described angle value and normal length must be signaled to determine the GEO boundary line for division. Since an encoding apparatus had to signal both the angular value and the normal length, there was a problem in that block division using GEO has an overhead in signaling.

The present invention proposes a method of increasing image encoding/decoding efficiency by dividing a block to be coded that are variously divided into square or non-square shapes by a diagonal line connecting the upper left and lower right corners or a diagonal line connecting the upper right and lower left corners. Hereinafter, block division using a diagonal line according to the present invention is described as diagonal motion portions (hereinafter referred to as DMPs), diagonal division, or triangular division.

The various block division forms described in this specification may mean at least one of a conventional quad-tree division form, quad-tree division form, binary-tree division form, ternary-tree division form, or a combination of the above-described division. That is, various block division types may mean various division types in which one block is divided into a plurality of square and non-square sub-coding blocks.

Furthermore, diagonal dividing according to the present invention may refer to a method of dividing the corresponding a square and non-square block using a diagonal line in a structure to which the above-described various block division types are applied and performing prediction using the same.

Figure 5:
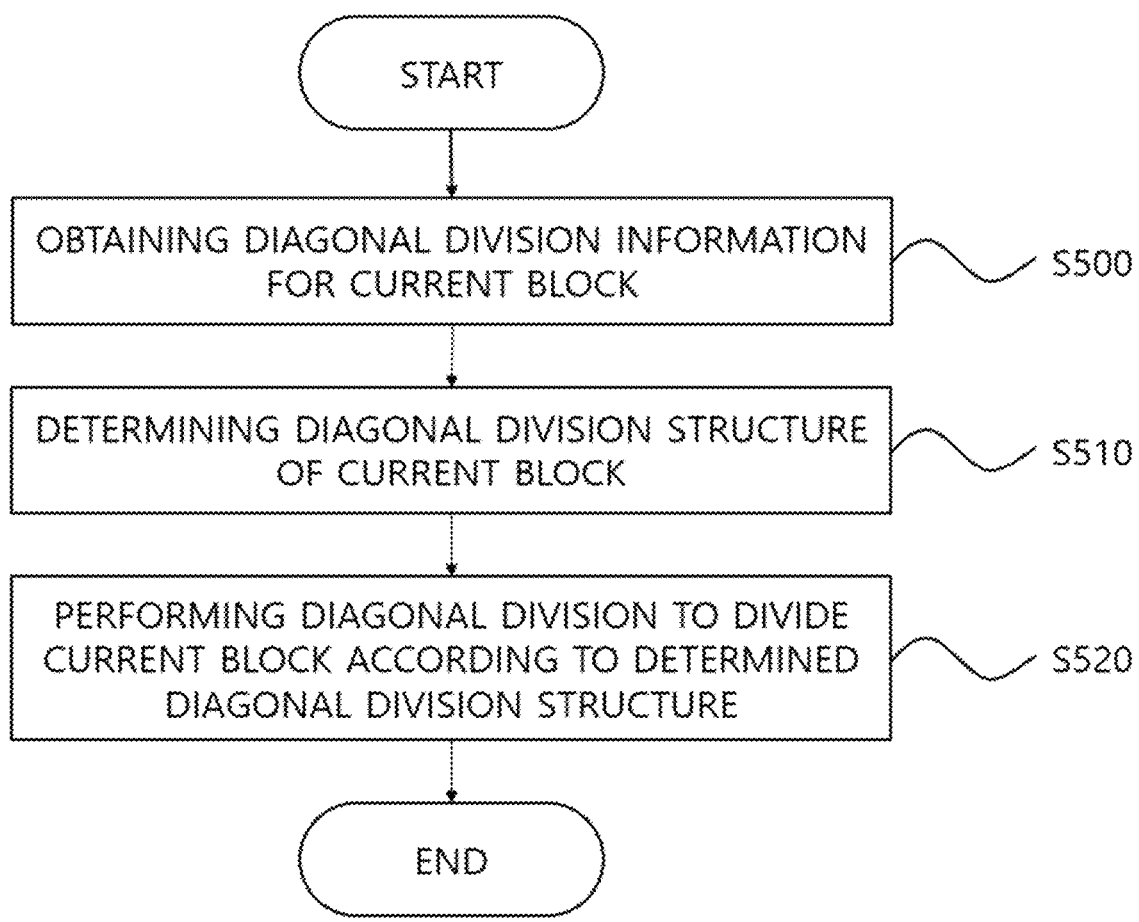
FIG. 5 is a flowchart illustrating an image decoding method according to an embodiment of the present invention.

FIG. 5 is a flowchart illustrating an image decoding method according to an embodiment of the present invention.

Referring to FIG. 5, a decoding apparatus may obtain division information for a current decoding target block (S500). More specifically, the decoding apparatus may entropy decode a bitstream transmitted from an encoding apparatus to obtain division information for the current block. Thereafter, the decoding apparatus may determine a diagonal division structure for the current block using the obtained division information (S510), and diagonally divide the current decoding target block according to the determined division structure. Here, the current block may mean an encoding block obtained by recursively applying square or non-square division.

That is, the current block here may mean a leaf node of square division or non-square division in which square division or non-square division is no longer applicable. In addition, the square division may refer to the quad-tree division described above, and the non-square division may refer to at least one of the above-described binary-tree division or ternary-tree division.

That is, the current block may be a block generated by applying recursively at least one of quad-tree division, binary-tree division, or ternary-tree division to an arbitrary coding unit. However, the current block is not limited to a coding block generated by the above-listed methods, and a block generated according to various types of block division methods that may be performed by a person skilled in the art may be applied to the present invention.

Figure 6:
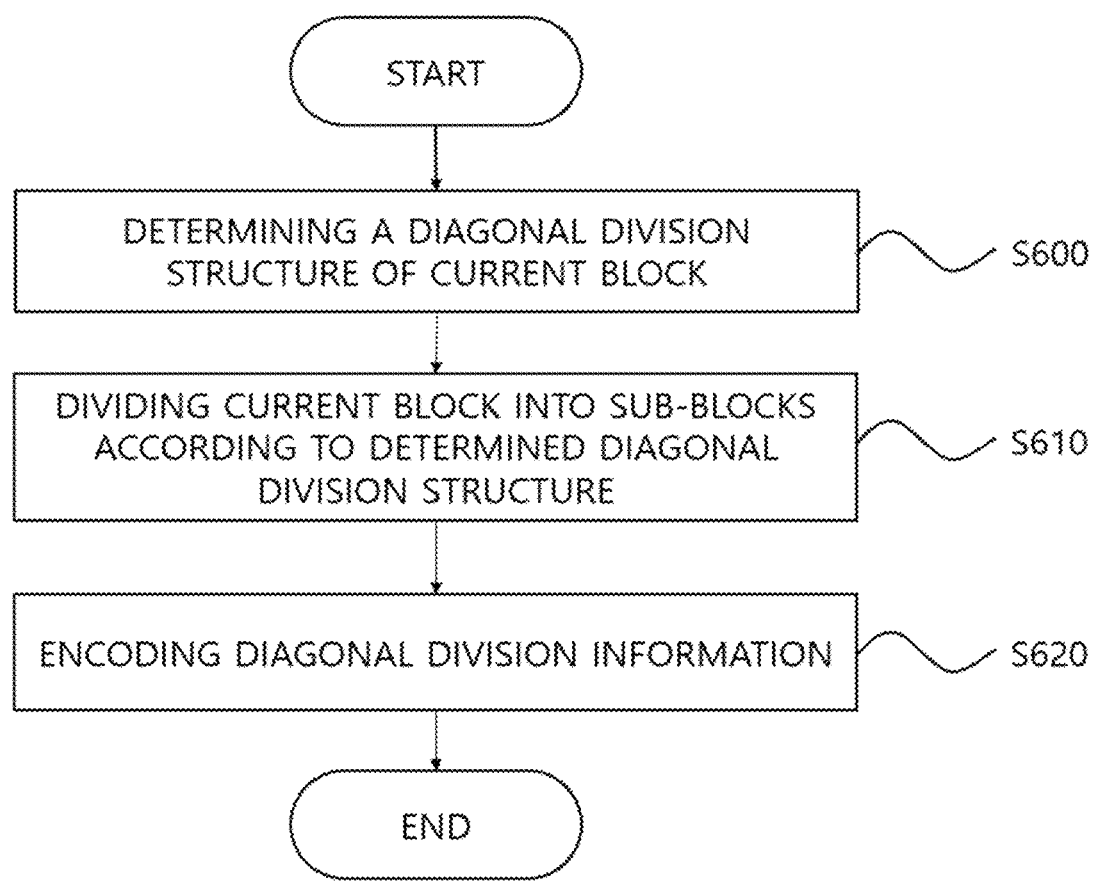
FIG. 6 is a diagram for explaining an image encoding method according to an embodiment of the present invention.

FIG. 6 is a diagram for explaining an image encoding method according to an embodiment of the present invention.

Referring to FIG. 6, an encoding apparatus may determine a diagonal division structure for the current block (S600). Here, the diagonal division structure may be determined as a block structure having optimal rate-distortion (RD) by utilizing various image encoding methods conventionally used. Then, the encoding apparatus may diagonally divide the current block according to the determined diagonal division structure (S610). Finally, the encoding apparatus may encode diagonal division information (S620).

For convenience, hereinafter, an example performed by the decoding apparatus of the present invention will be described, but the described embodiments may be performed in the same manner in the encoding apparatus and the decoding apparatus. In addition, the same embodiment may be applied to each of the luminance and chrominance signals, and the embodiment according to the present invention may be applied to only one of the luminance and chrominance signals.

Also, the present invention may be applied according to the size of the current block or the size of a sub-block in which the current block is divided. Here, the size may be defined as a minimum size and/or a maximum size to which the above embodiments are applied, or may be defined as a fixed size to which the above embodiments are applied. Further, the above embodiments of the present invention may be applied only when the size of the current block or a sub-block of the current block is greater than or equal to a minimum size and less than or equal to a maximum size. That is, the above embodiments may be applied only when the block size is included within a certain range.

Figure 7:
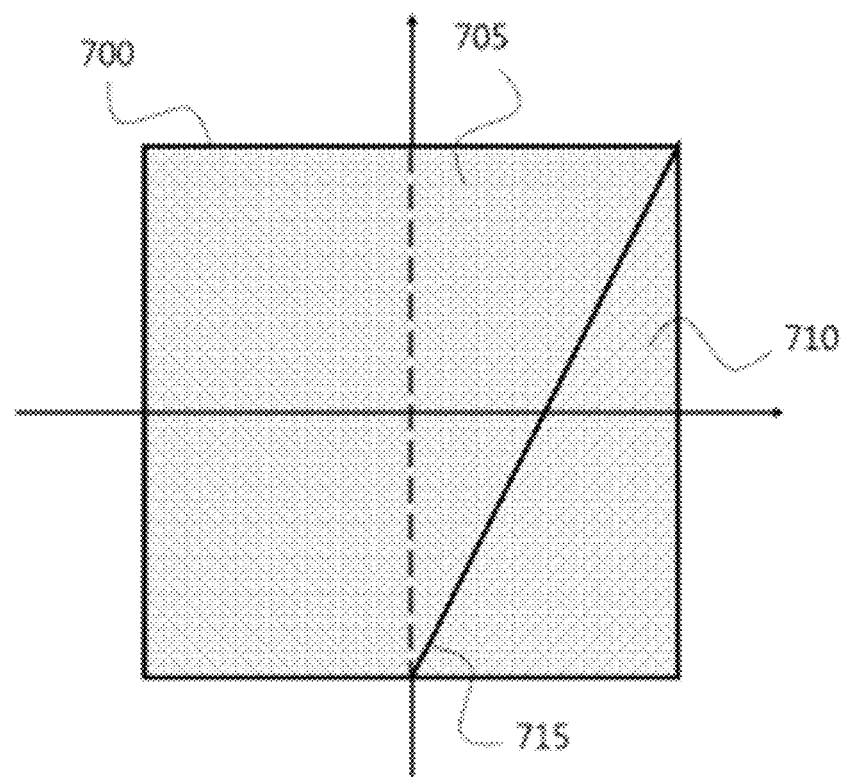
FIG. 7 is another diagram for explaining an image decoding method according to an embodiment of the present invention.
Figure 8:
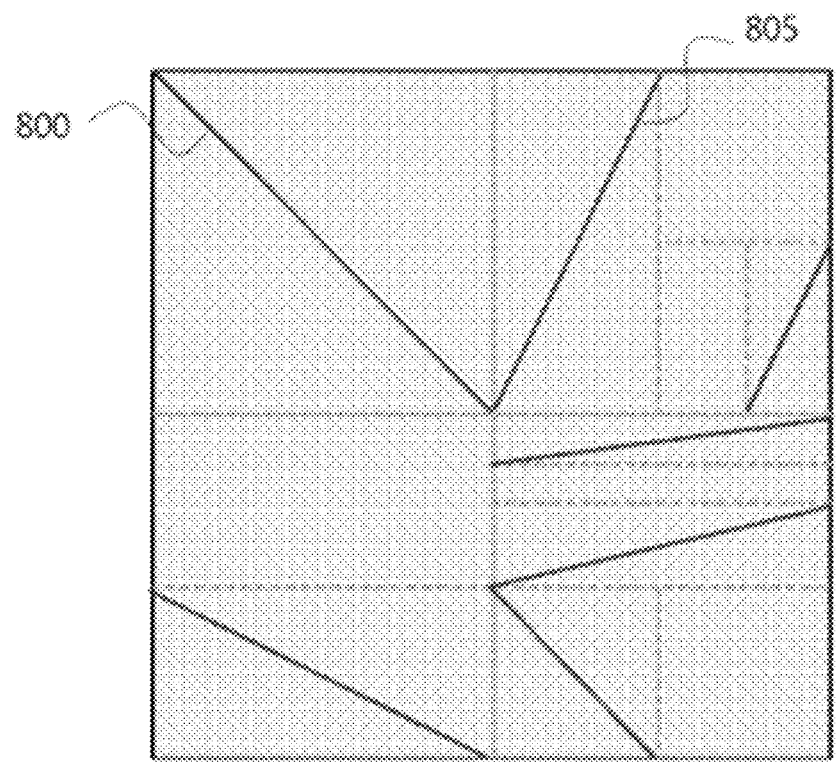
FIG. 8 is another diagram for explaining that diagonal division according to an embodiment of the present invention may represent various arbitrary division types.

FIG. 7 is another diagram for explaining an image decoding method according to an embodiment of the present invention, FIG. 8 is another diagram for explaining that diagonal division according to an embodiment of the present invention may represent various arbitrary division types.

Referring to FIGS. 7 and 8, a method (S520) in which the decoding apparatus performs diagonal division on the current block will be described in detail. In the following description, the current block may refer to a block in which square or non-square block division is recursively performed on an arbitrary coding unit, and square or non-square block division is no longer performed. That is, the current block may mean a leaf node of square division or non-square division. That is, the current block may have either a square shape or a non-square shape.

Alternatively, in the following description, the current block may refer to a block in which quad-tree division for an arbitrary coding unit is recursively performed so that no further quad-tree division is performed. That is, in this case, the current block may have a square shape or a non-square shape, and may be subjected to additional binary-tree division or ternary-tree division.

That is, the current block of the present specification is a target block that may be a target of diagonal division, and may mean a block generated as a result of performing at least one square or non-square block division on at least one coding unit.

That is, as a result of performing at least one of quad-tree division, binary-tree division or ternary-tree division on an arbitrary coding unit, a block that may be a target of diagonal division of the present specification, may mean a leaf node of a square division or a non-square division in which no further quad-tree division, binary-tree division or ternary-tree division may be performed.

The decoding apparatus may divide one block 700 into two different regions 705 and 710. In this case, a boundary line dividing one block into two areas may be defined as a diagonal line 715 of diagonal division. The boundary line 715 of the diagonal division may be defined by two variables.

Two regions of a block to be divided based on the boundary line 715 of division may be defined as a first region and a second region. Although the region 705 on the left side is defined as the first region and the region 710 on the right side as the second region on the description of FIG. 7, the meanings of the first region and the second region are not limited to this description. The divided two regions may be defined as a first region or a second region regardless of position and shape.

Unlike the existing GEO-based block division method, which expresses the boundary line 415 of GEO division using an angular value and a normal length, the present invention may divide an arbitrary coding block by using square division or non-square division for an arbitrary coding unit and diagonal division for a current block.

FIG. 7 shows an example in which the decoding apparatus acquires the same block division structure as the division structure described in FIG. 4 by using one vertical binary tree division and one diagonal division.

FIG. 7 shows that one square block 700 is divided into two non-square blocks according to vertical binary tree division. Herein, diagonal division may not be applied to the non-square block on the left. That is, FIG. 7 shows an example in which diagonal division is performed only for the right non-square block among the two non-square blocks. The decoding apparatus may obtain a division structure of the same form as the GEO division through the combination of square division or non-square division and diagonal division.

That is, according to the present invention, it is possible to express an arbitrary block division form only with square division or non-square block division and division information of diagonal division.

FIG. 8 shows several coding blocks diagonally divided according to the present invention. The decoding apparatus may divide a current block diagonally. In the following, the direction of dividing a block by connecting the upper left vertex and the lower right vertex is defined as diagonal division in the down-right direction. In addition, the direction of dividing the block by connecting the upper right vertex and the lower left vertex is defined as diagonal division in the up-right direction.

The decoding apparatus may perform diagonal division in the lower right direction or diagonal division in the upper right direction with respect to the current block. The first coding block illustrated in FIG. 8 shows diagonal division performed by the lower right boundary line 800. The second coding block illustrated in FIG. 8 shows diagonal division performed by the upper right boundary line 805. The decoding apparatus may divide the coding block in the down-right direction or the up-right direction according to the division information.

According to FIG. 8, the decoding apparatus may diagonally divide not only a square block but also a non-square block.

Figure 9:
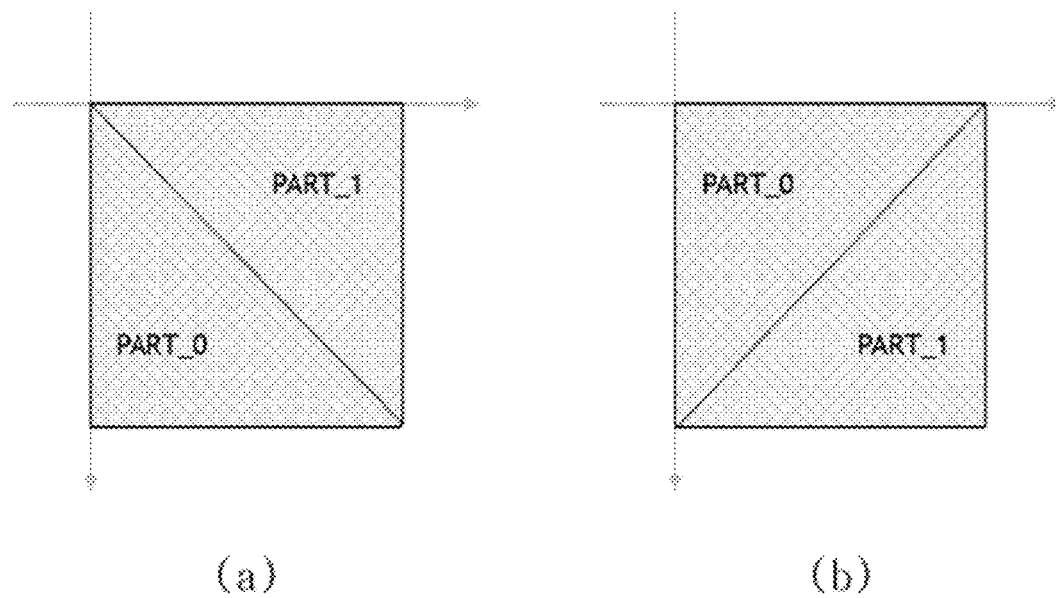
FIG. 9 is another diagram for explaining a method of determining a direction of diagonal division according to an embodiment of the present invention.

FIG. 9 is another diagram for explaining a method of determining a direction of diagonal division according to an embodiment of the present invention.

FIG. 9(a) shows diagonal division in the down-right direction, and 9(b) shows diagonal division in the up-right direction. The boundary of the division for dividing the current block may be defined according to Equation 1 below.

the boundary of diagonal division in the down-right direction: $f(x,y)=w*y-h*x$ the boundary of diagonal division in the up-right direction: $f(x,y)=w*(h-y)-h*x$ [Equation 1]

Here, h and w may be vertical (height) and horizontal (width) of the current block, which are the targets of diagonal division, respectively. Equation 1 is defined by using the coordinates at the top left of the current block as the origin. Equation 1 described above may be one example for representing a down-right diagonal line and an up-right diagonal line of an arbitrary square or non-square block. That is, there may be one or more equations representing diagonal division according to the present invention and the equations representing diagonal division according to the present invention are not limited to Equation 1 described above.

In addition, two regions generated by diagonal division shown in FIG. 9(a) or 9(b) may be defined as a first and second region, respectively. The region on the left is defined as the first region and the region on the right as the second region based on the diagonal line of the diagonal division, but the meanings of the first region and the second region are not limited to this description. The divided two regions may be defined as a first region or a second region regardless of position and shape.

Figure 10:
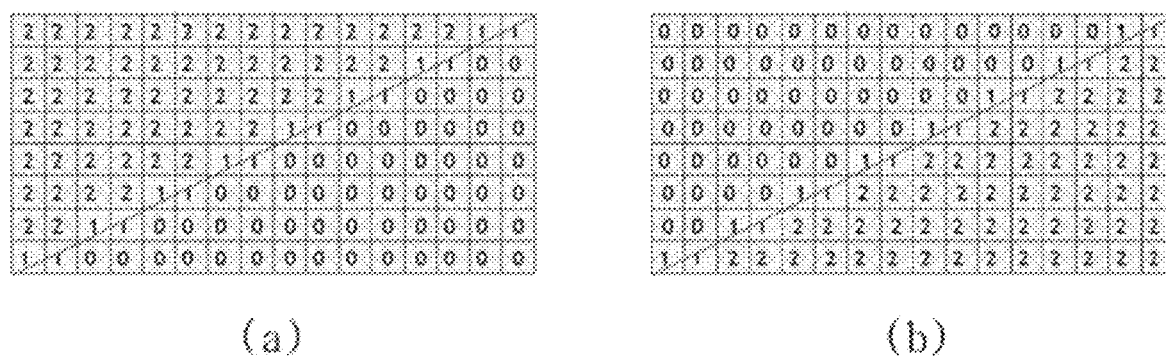
FIG. 10 is a view for explaining a masking method according to an embodiment of the present invention.

FIG. 10 is a view for explaining a masking method according to an embodiment of the present invention.

Referring to FIG. 10, a method of classifying samples existing on a boundary line of diagonal division by a decoding apparatus will be described. When the decoding apparatus divides an arbitrary coding block into two regions, there is a problem that it is difficult to determine which region to include samples located on the boundary line.

Since a sample is a minimum unit of image encoding, it may not be divided anymore, so it is impossible to divide a sample into two regions. In order to solve this problem, the decoding apparatus may perform masking on samples in a coding block that is a target of diagonal division. Here, the masking may be performed on both the samples located on the diagonal line of the diagonal division, as well as the samples around the diagonal line of the diagonal division and the samples in the diagonal divided region.

In the specification of the present invention, masking may refer to a method of determining which region of a first region and a second region a specific sample included in the decoding block to be diagonally divided belongs to.

Alternatively, masking in the specification of the present invention may mean a method of performing a preset weighting operation on each sample of a decoding block to be diagonally divided. Since it is impossible to divide a single sample, it may mean a method of expressing a sample through which the boundary line of diagonal division passes as a weighted sum of two regions.

FIG. 10 shows an example in which the decoding apparatus applies masking in the up-right direction to a 16×8 sized coding block. FIG. 10(a) shows masking for the first region of the diagonal division in the up-right direction, and FIG. 10(b) shows masking for the second region of the diagonal division in the up-right direction. The masking method may be defined in advance. In addition, the masking method may be determined differently depending on the size of the target block and the dividing direction.

As an example, masking may be defined according to Equation 2 below. However, the scope of the present invention is not limited by the numerical values provided in Equation 2.

$$MASK_{P0}(x, y) = \begin{cases} 2, & \text{if } f(x, y) > 0, \\ 1, & \text{if } f(x, y) = 0, \\ 0, & \text{otherwise}, \end{cases}$$

and $$MASK_{P1}(x, y) = \begin{cases} 0, & \text{if } f(x, y) > 0, \\ 1, & \text{if } f(x, y) = 0, \\ 2, & \text{otherwise}. \end{cases}$$

[Equation 2]

In Equation 2 above, Mask_p0 and Mask_p1 may mean weight values for determining the pixel value of each region sample. In Equation 2, samples satisfying f(x, y)>0 may be defined as first samples, samples satisfying f(x, y)=0 may be defined as boundary region samples, and samples corresponding to the rest may be defined as second samples.

According to Equation 2, the coding block to be diagonally divided may be expressed by the first sample consisting of samples located in either direction relative to the boundary line among the samples included in the region where the boundary line of the diagonal division does not pass, the second sample consisting of samples through which the boundary line of the diagonal division passes, and the third sample consisting of samples not included in the first sample and the second sample.

Herein, the masking for the first area may be to apply the first value, the second value, and the third value to the first sample, the second sample, and the third sample, respectively. In this case, the masking for the second region may be to apply a third value, a second value, and a first value to the first sample, the second sample, and third sample, respectively. Herein, as described in Equation 2, the first value, the second value, and the third value may be 2, 1, and 0, respectively.

By combining Equation 1 and Equation 2, a sample value of the final current block may be defined according to Equation 3 below. However, the scope of the present invention is not limited by numerical values or variables provided in Equation 3.

$$P_{DMP}(x,y)=(P_{P0}(x,y) \times MASK_{P0}(x,y)+P_{P1}(x,y) \times MASK_{P1}(x,y)) >> shift$$

[Equation 3]

Here, P_DMP (x, y) may be a sample value of a specific sample of a current block, and P_p0 (x, y) and P_p1 (x, y) may be a sample value of a sample belonging to the first region or the second region, respectively. The shift may be a value for scaling a sample value according to masking. For example, the value of the shift may be 1.

P_p0 (x, y) and P_p1 (x, y) may refer to prediction samples obtained by performing motion compensation on a reference picture using different motion vectors corresponding to each region of diagonal division. Also, P_p0 (x, y) and P_p1 (x, y) may mean sample values of reconstructed samples corresponding to each region of the current block.

Figure 11:
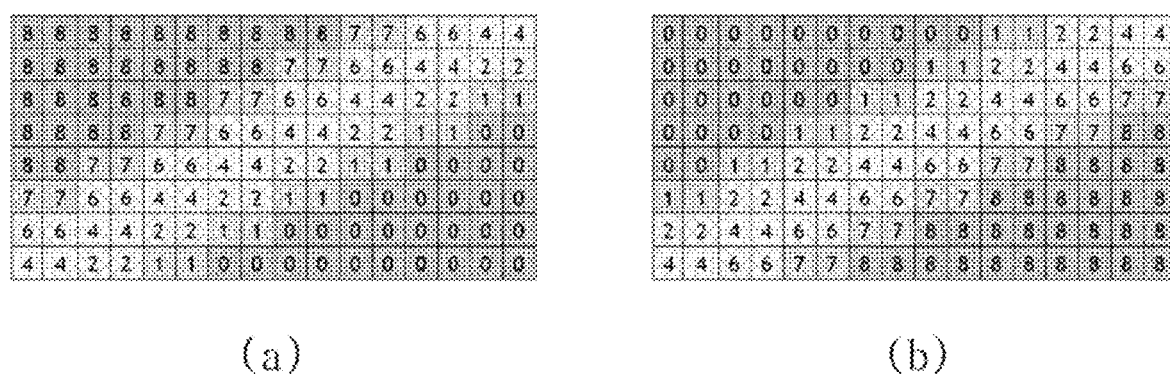
FIG. 11 is a view for explaining a masking method according to another embodiment of the present invention.

FIG. 11 is a view for explaining a masking method according to another embodiment of the present invention.

Since the samples adjacent to the boundary line or the boundary of the diagonal division are obtained by a weighted sum operation of samples obtained from physically different regions, discontinuities on the image may occur in the samples adjacent to the boundary line or the boundary of the diagonal division. In order to prevent discontinuous in these samples, the decoding apparatus may perform masking considering the discontinuity of the sample values. In this specification, motion compensation in consideration of such discontinuity in the image encoding/decoding area may be defined as overlapped block compensation (hereinafter referred to as OBMC) or position-based motion compensation. The decoding apparatus may diagonally divide the current block in consideration of OBMC. In the following description, masking considering discontinuity of a sample value adjacent to a boundary line or boundary of diagonal division is described as masking considering discontinuity of samples.

FIG. 11 shows an embodiment in which a decoding apparatus performs masking in consideration of discontinuities of samples for an encoding block. Specifically, FIG. 11 shows that the decoding apparatus performs masking of diagonal division in the up-right direction on a 16×8 sized coding block. FIG. 11(a) shows the masking for the first region of the diagonal division in the up-right direction, and FIG. 11(b) shows the masking for the second region of diagonal division in the up-right direction. The masking method and weight set value considering the discontinuities of the samples may be previously defined. In addition, the masking method and the weight set value considering the discontinuities of the samples may be determined according to the size and division direction of a target block of diagonal division, a motion vector, a chrominance component, and so on.

Referring to FIGS. 11(a) and 11(b), it may be seen that the masking value gradually decreases or increases in a direction different from the boundary direction of diagonal division. That is, when the diagonal division direction is the up-right direction, the masking weight value may gradually decrease or increase in the down-right direction. Specifically, the largest masking value may be assigned to the sample farthest from the boundary line. On the other hand, in the direction opposite to the direction in which the largest masking value is allocated based on the boundary line, the smallest masking value (for example, 0) may be allocated to the farthest sample.

That is, in FIG. 11(a), the masking value for the first region may be allocated to be gradually decreased in the down-right direction. Similarly, in FIG. 11(b), the masking value for the second region may be allocated to be gradually increased in the down-right direction. The masking set values illustrated in FIGS. 11A and 11B are examples of the present invention, and the scope of the present invention is not limited thereto.

For example, a weight set value may be determined as {0, 1, 2, 4, 6, 7, 8}. In consideration of the scaling value, the weight set value may be determined as {0, 1/8, 2/8, 4/8, 6/8, 8/8}. As another example, the weight set value may be determined as {0, 1, 2, 3, 4, 5, 6, 7, 8}. In consideration of the scaling value, the weight set value may be determined as {0, 1/8, 2/8, 3/8, 4/8, 5/8, 6/8, 7/8, 8/8}. The above-described weight set value is an example, and the weight set value may be determined using a combination of various values that gradually increase or decrease.

In addition, the decoding apparatus may apply different weight set values to the luminance component and the chrominance component. For example, When applying {0, 1, 2, 4, 6, 7, 8} or {0, 1/8, 2/8, 4/8, 6/8, 8/8} as the weight set value of the luminance component masking, the weight set value of {0, 1, 4, 7, 8} or {0, 1/8, 4/8, 7/8, 8/8} may be used for chrominance component masking. As another example, When applying {0, 1, 2, 3, 4, 5, 6, 7, 8} or {0, 1/8, 2/8, 3/8, 4/8, 5/8, 6/8, 7/8, 8/8} as the weight set value of the luminance component masking, the weight set value of {0, 2, 4, 6, 8} or {0, 2/8, 4/8, 6/8, 8/8} may be used for chrominance component masking. A corresponding example of the weight set described above is one example, and may be determined by using a combination of various other values with the weight set of the luminance component masking.

The decoding apparatus may allow masking in consideration of discontinuities of samples to be applied only when a size of a coding block exceeds a preset size or is greater than or equal to the preset size. For example, the decoding apparatus may allow masking in consideration of discontinuities of samples to be applied to diagonal division of a current block or a sub-block of the current block, only when the number of samples of a specific coding block exceeds 256.

As another example, the decoding apparatus may allow masking in consideration of discontinuities of samples to be applied to the block division only when a horizontal and/or vertical size of a current block exceeds a preset size or is greater than or equal to the preset size. For example, the decoding apparatus may allow masking in consideration of discontinuities of samples to be applied to diagonal division of a current block or a sub-block of the current block only when at least one of the horizontal or vertical size of the current block is greater than 16.

The encoding apparatus and the decoding apparatus may define an indicator indicating whether masking in consideration of discontinuities of samples is applied to a current block. The indicator may be defined as a flag having a size of 1 bit. For example, when the flag has the first value, the decoding apparatus may divide the current block diagonally by applying masking in consideration of discontinuities of samples.

The indicator indicating whether masking in consideration of discontinuities of samples is applied may be transmitted together with not only a flag, but also block shape information and motion information. Also, whether masking in consideration of discontinuities of samples is applied may be indirectly indicated by the size of the current block.

FIG. 11 is a diagram for explaining syntax parameters according to an embodiment of the present invention.

Several parameters may be proposed to indicate block or motion information to which diagonal division according to the present invention is applied.

The encoding apparatus and the decoding apparatus may define a flag (DMP_flag) indicating whether diagonal division is applied to a current block. When the DMP_flag has the first value, the encoding apparatus and the decoding apparatus may diagonally divide the current block. Conversely, when the DMP_flag has the second value, the encoding apparatus and the decoding apparatus may not diagonally divide the current block.

Here, flag information indicating whether diagonal division is applied may be transmitted in a unit of one coding block. Herein, the one coding block may mean a leaf node of a square division or non-square division in which square division or non-square division may no longer be applied.

The encoding apparatus and the decoding apparatus may define a direction indicator (DMP_direction) indicating a direction of diagonal division. When the DMP_direction has the first value, the encoding apparatus and the decoding apparatus may apply diagonal division in the upper right direction to a current block. Conversely, when the DMP_direction has a second value, the encoding apparatus and the decoding apparatus may apply diagonal division in the lower right direction to the current block.

The division information of the present invention may include DMP_flag and DMP_direction.

The encoding apparatus and the decoding apparatus may define a DMP merge flag (DMP_merge_flag) indicating whether a merge mode is applied to a region to which diagonal division is applied. When the DMP merge flag has a first value, the encoding apparatus and the decoding apparatus may encode/decode a diagonally divided region through a merge mode. The DMP merge flag may be determined in a unit of a current block, or may be determined in a unit of a region in which the current block is divided.

When the DMP merge flag has the first value, the encoding apparatus and the decoding apparatus may define a merge index (DMP_merge_idx) indicating a merge candidate for the diagonally divided region. The DMP merge index may be determined in a unit of one block, or may be determined in a unit of a divided region by performing diagonal division.

A diagonally divided area may include motion information. Here, the motion information may include, but is not limited to, an intra prediction direction, a reference picture index, a motion vector, a differential motion vector, and AMVP motion information. Also, the motion information may be determined in a unit of one block, or may be determined in a unit of a divided region by performing diagonal division.

As another example, the encoding apparatus and the decoding apparatus may define a diagonal division merge index (dmp_merge_idx) indicating a preset of a merge candidate for each region when diagonal division is performed. For example, when the diagonal division merge index specifies the first value, the decoding apparatus may perform prediction on a current block using a division direction corresponding to the first value and a preset merge candidate of each region. have. For example, the merge index may be predefined to have one of predefined integer values greater than zero.

Figure 12:
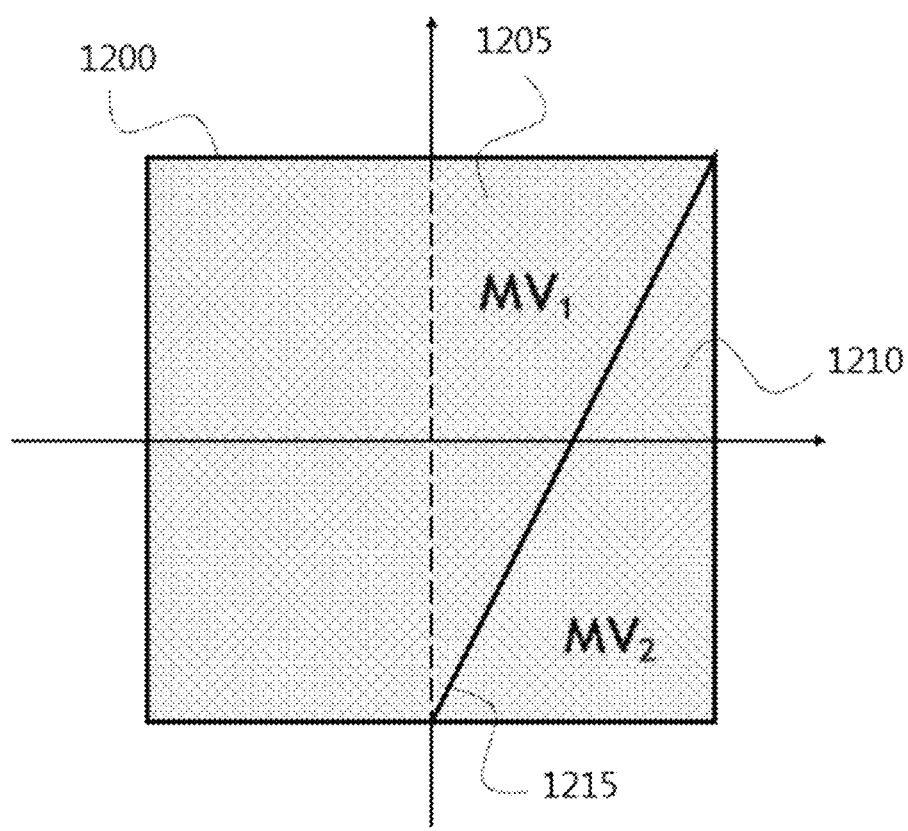
FIG. 12 is a diagram for explaining a syntax parameter according to an embodiment of the present invention.

FIG. 12 shows an example in which the current block 1200 is divided into two sub-coding blocks using binary tree division, and one of the sub-coding blocks is divided into the first region 1205 and the second region 1210 by the boundary line 1215 of the diagonal division.

The decoding apparatus may divide the current block by applying vertical binary tree division to the current block 1100. Herein, the decoding apparatus may check a binary tree flag (BT_split_flag) to apply binary tree division to the current block, and if the value is the first value, may divide the current block into binary trees. Furthermore, when it is determined that the current block is divided into the binary trees by the binary tree flag, the decoding apparatus may determine whether to divide the current block vertically or horizontally by checking a division type indicator (BT_split_type).

The decoding apparatus may determine whether a current block is diagonally divided when it is determined that there is no additional square division or non-square division on the current block. Herein, the decoding apparatus may check a DMP_flag to apply diagonal division to the current block, and if the value is the first value, may divide the current block diagonally. Furthermore, when it is determined that the current block is diagonally divided by the DMP_flag, the decoding apparatus may determine whether to divide the current block diagonally in the lower right direction or diagonally in the upper right direction by checking a DMP_direction. For example, in FIG. 11, the decoding apparatus may determine that the DMP_direction has the first value, and then divide the current block diagonally in the upper right direction.

Thereafter, the decoding apparatus may derive a motion vector MV1 of the first region 1105 diagonally divided and a motion vector MV2 of the second region 1110, respectively.

It is obvious that the above-described parameter variables and values are exemplary and the scope of the present invention is not limited to the terms used in the specification.

An inter prediction method according to the present invention may be applied to an inter prediction method in a unit of a sample. That is, the inter prediction method according to the present invention may not be applied to an inter prediction method in a unit of a sub-block. More specifically, the inter prediction method according to the present invention includes sub-block-based temporal candidate prediction (ATMVP: Alternative temporal motion vector prediction), sub-block-based spatial-temporal combination candidate prediction (STMVP: spatial-temporal motion vector prediction), frame rate conversion. (It may not apply to FRUC (Frame Rate Up Conversion), and the like.

Various embodiments of the present disclosure are not intended to list all possible combinations, but are intended to describe representative aspects of the present disclosure, and the matters described in various embodiments may be applied independently or in combination of two or more.

In addition, various embodiments of the present disclosure may be implemented by hardware, firmware, software, or a combination thereof. In the case of implementation by hardware, it may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontrollers, microprocessors, and the like.

The scope of the present disclosure includes software or machine-executable instructions (e.g., operating systems, applications, firmware, programs, etc.) that cause an operation according to various embodiment methods to be executed on an apparatus or computer, and such software or Instructions include a non-transitory computer-readable medium that is stored and executable on an apparatus or computer.

INDUSTRIAL APPLICABILITY

The present invention may be used to encode/decode an image.

What is claims is:

1. A device comprising circuitry configured to perform a method of decoding an image with a decoding apparatus, the method comprising:
dividing, with the decoding apparatus, based on a predetermined division line, a current block in the image into a plurality of partitions, the plurality of partitions including a first partition and a second partition;
determining, with the decoding apparatus, a reference block of the first partition and a reference block of the second partition; and
predicting, with the decoding apparatus, a current pixel in the current block by applying a predetermined weight to a first pixel belonging to the reference block of the first partition and a second pixel belonging to the reference block of the second partition,
wherein the predetermined weight is determined, based on a position of the current pixel in the current block, as one of a plurality of weight candidates,
wherein each of the plurality of weight candidates (w0, w1) includes a first weight (w0) to be applied to the first pixel belonging to the reference block of the first partition and a second weight (w1) to be applied to the second pixel belonging to the reference block of the second partition,
wherein a sum of the first weight and the second weight is 8,
wherein the plurality of weight candidates includes at least one of (0, 8), (1, 7), (2, 6), (4, 4), (6, 2), (7, 1), or (8, 0),
wherein, in response to a case in which the current pixel in the current block is representative of a pixel located on the division line, the first and second weights are determined as 4, respectively,
wherein, in response to a case in which the current pixel in the current block is representative of a neighboring pixel diagonally adjacent to the pixel located on the division line, the first weight is determined as one of 2 or 6 and the second weight is determined as the other one of 2 or 6, and wherein a shape of at least one of the first partition and the second partition is triangular.

2. The device of claim 1, wherein the current block is determined by dividing a coding block based on a tree-based block division, wherein the tree-based block division includes at least one of a binary-tree division or a ternary-tree division, and wherein the binary-tree division is a division type of horizontally or vertically dividing one coding block into two coding blocks and the ternary-tree division is a division type of horizontally or vertically dividing one coding block into three coding blocks.

3. The device of claim 2, wherein the division of the current block is performed only on the block for which the tree-based block division is no longer performed.

4. The device of claim 1, further comprising: deriving, with the decoding apparatus, motion information of the current block based on a merge mode, wherein the motion information is derived for each of the first partition and the second partition included in the current block.

5. The device of claim 4, wherein the first partition has a merge index different from the second partition, and wherein the merge index indicates a merge candidate of the first partition.

6. A device comprising circuitry configured to perform a method of encoding an image with an encoding apparatus, wherein a current block in the image is divided, based on a predetermined division line, into a plurality of partitions including a first partition and a second partition, the method comprising:

determining, with the encoding apparatus, a reference block of the first partition and a reference block of the second partition; and predicting, with the encoding apparatus, a current pixel in the current block by applying a predetermined weight to a first pixel belonging to the reference block of the first partition and a second pixel belonging to the reference block of the second partition, wherein the predetermined weight is determined, based on a position of the current pixel in the current block, as one of a plurality of weight candidates, wherein each of the plurality of weight candidates (w0, w1) includes a first weight (w0) to be applied to the first pixel belonging to the reference block of the first partition and a second weight (w1) to be applied to the second pixel belonging to the reference block of the second partition, wherein a sum of the first weight and the second weight is 8, wherein the plurality of weight candidates includes at least one of (0, 8), (1, 7), (2, 6), (4, 4), (6, 2), (7, 1), or (8, 0), wherein, in response to a case in which the current pixel in the current block is representative of a pixel located on the division line, the first and second weights are determined as 4, respectively, wherein, in response to a case in which the current pixel in the current block is representative of a neighboring pixel diagonally adjacent to the pixel located on the division line, the first weight is determined as one of 2 or 6 and the second weight is determined as the other one of 2 or 6, and wherein a shape of at least one of the first partition and the second partition is triangular.

7. A non-transitory computer-readable medium containing instructions that, when executed by a processor, cause a device to perform an encoding method for encoding an image signal, wherein a current block in the image signal is divided, based on a predetermined division line, into a plurality of partitions including a first partition and a second partition, and wherein the encoding method comprises:

determining, with an encoding apparatus, a reference block of the first partition and a reference block of the second partition; and predicting, with the encoding apparatus, a current pixel in the current block by applying a predetermined weight to a first pixel belonging to the reference block of the first partition and a second pixel belonging to the reference block of the second partition, wherein the predetermined weight is determined, based on a position of the current pixel in the current block, as one of a plurality of weight candidates, wherein each of the plurality of weight candidates (w0, w1) includes a first weight (w0) to be applied to the first pixel belonging to the reference block of the first partition and a second weight (w1) to be applied to the second pixel belonging to the reference block of the second partition, wherein a sum of the first weight and the second weight is 8, wherein the plurality of weight candidates includes at least one of (0, 8), (1, 7), (2, 6), (4, 4), (6, 2), (7, 1), or (8, 0), wherein, in response to a case in which the current pixel in the current block is representative of a pixel located on the division line, the first and second weights are determined as 4, respectively, wherein, in response to a case in which the current pixel in the current block is representative of a neighboring pixel diagonally adjacent to the pixel located on the division line, the first weight is determined as one of 2 or 6 and the second weight is determined as the other one of 2 or 6, and wherein a shape of at least one of the first partition and the second partition is triangular.

* * * * *